(12) United States Patent
Roth et al.

(10) Patent No.: US 8,753,704 B2
(45) Date of Patent: Jun. 17, 2014

(54) METHOD FOR APPLYING TREATMENT MATERIALS TO FOODSTUFFS

(75) Inventors: Nicholas A. Roth, Dakota Dunes, SD (US); Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 859 days.

(21) Appl. No.: 12/342,827

(22) Filed: Dec. 23, 2008

(65) Prior Publication Data

US 2010/0159087 A1 Jun. 24, 2010

(51) Int. Cl.

| | |
|---|---|
| A23C 3/00 | (2006.01) |
| A23L 3/36 | (2006.01) |
| C12C 7/26 | (2006.01) |
| A23B 9/18 | (2006.01) |
| A23B 4/20 | (2006.01) |
| A23L 1/31 | (2006.01) |
| A23L 1/315 | (2006.01) |
| A23L 3/3463 | (2006.01) |
| A23B 4/08 | (2006.01) |
| A23B 4/16 | (2006.01) |
| A23L 3/365 | (2006.01) |
| A23B 4/06 | (2006.01) |
| A23B 7/154 | (2006.01) |

(52) U.S. Cl.
CPC . *A23B 4/08* (2013.01); *A23L 3/365* (2013.01); *A23B 4/066* (2013.01); *A23B 4/16* (2013.01); *A23B 9/18* (2013.01); *A23L 3/3463* (2013.01); *A23B 7/154* (2013.01); *A23B 4/20* (2013.01)
USPC ............ 426/524; 426/319; 426/335; 426/332

(58) Field of Classification Search
CPC .............. A23B 4/08; A23B 4/16; A23B 4/20; A23L 3/3463
USPC .................. 426/524, 531, 246, 319, 335, 332
See application file for complete search history.

(56) References Cited

U.S. PATENT DOCUMENTS

| | | | |
|---|---|---|---|
| 1,562,360 A | 11/1925 | Ottesen | |
| 2,280,827 A * | 4/1942 | Hoveman | 426/393 |

(Continued)

FOREIGN PATENT DOCUMENTS

| | | |
|---|---|---|
| JP | 58047429 A | 3/1983 |
| JP | 64-39965 | 2/1989 |

(Continued)

OTHER PUBLICATIONS

Carbonic Acid., The Hutchinson Unabridged Encyclopedia (2009).*

(Continued)

*Primary Examiner* — Rena L Dye
*Assistant Examiner* — Assaf Zilbering
(74) *Attorney, Agent, or Firm* — The Culbertson Group, P.C.; Russell D. Culbertson

(57) ABSTRACT

High concentration, that is, strong antimicrobial treatment materials such as high concentration aqueous ammonia solutions or even liquid ammonia may be applied to a foodstuff without deleterious effects by controlling the temperature of the foodstuff at or immediately after the time of contact with the antimicrobial treatment material. In particular, ice crystals are maintained at or just below the surface of the foodstuff at or immediately after the time of contact with the antimicrobial treatment material. The ice crystals in the foodstuff inhibit absorption of the antimicrobial treatment material into the foodstuff.

23 Claims, 5 Drawing Sheets

(56) References Cited

U.S. PATENT DOCUMENTS

| | | |
|---|---|---|
| 3,023,109 A | 2/1962 | Hines |
| 3,664,146 A | 5/1972 | Butts |
| 3,774,524 A | 11/1973 | Howard |
| 4,220,669 A | 9/1980 | Townsend |
| 4,292,889 A | 10/1981 | Townsend |
| 5,012,728 A | 5/1991 | Langen et al. |
| 5,082,679 A | 1/1992 | Chapman |
| 5,436,017 A | 7/1995 | Ludwig et al. |
| 5,489,443 A | 2/1996 | Knipe et al. |
| 5,638,744 A | 6/1997 | Smith |
| 5,664,488 A | 9/1997 | Smith |
| 5,773,060 A | 6/1998 | Smith |
| 5,807,598 A | 9/1998 | Liberman et al. |
| 5,871,795 A | 2/1999 | Roth |
| 6,142,067 A | 11/2000 | Roth |
| 6,379,728 B1 | 4/2002 | Roth |
| 6,387,426 B1 | 5/2002 | Roth |
| 6,389,838 B1 | 5/2002 | Roth |
| 6,406,728 B1 | 6/2002 | Roth |
| 6,564,700 B2 | 5/2003 | Roth |
| 6,565,904 B2 | 5/2003 | Roth |
| 6,713,108 B2 | 3/2004 | Roth |
| 6,899,908 B2 | 5/2005 | Roth |
| 6,964,787 B2 | 11/2005 | Swart et al. |
| 7,022,361 B2 | 4/2006 | Roth |
| 7,045,162 B2 | 5/2006 | Roth |
| 7,093,973 B2 | 8/2006 | Roth |
| 7,214,398 B2 | 5/2007 | Roth |
| 7,322,284 B2 | 1/2008 | Roth |
| 2004/0109925 A1* | 6/2004 | Roth .................. 426/319 |
| 2006/0127545 A1 | 6/2006 | Newman |
| 2006/0141109 A1 | 6/2006 | Roth |
| 2006/0286221 A1* | 12/2006 | Roth et al. .................. 426/263 |
| 2006/0292274 A1 | 12/2006 | Garwood |
| 2007/0059201 A1 | 3/2007 | Sundaram et al. |

FOREIGN PATENT DOCUMENTS

| | | |
|---|---|---|
| JP | 03004737 A | 1/1991 |
| SU | 528923 | 12/1976 |

OTHER PUBLICATIONS

Van Auken et al., "Food Preservation and Antibacterial Properties of Four Fluoroalkane Compounds". Canadian Journal of Microbiology 20(6): 891-896 (1974).*

International Search Report for PCT/US09/68838 dated Mar. 2, 2010 (2 pages).

Written Opinion of the International Search Authority (PCT Rule 43bis.1) for PCT/US09/68838 dated Mar. 2, 2010 (8 pages).

USPTO BPAI Decision on Appeal (Apr. 28, 2008), U.S. Appl. No. 10/951,076, filed Apr. 28, 2008, 11 Pages.

USPTO BPAI Decision on Request for Reheading, U.S. Appl. No. 10/951,076, filed Nov. 20, 2008, 6 pages.

* cited by examiner

METHOD FOR APPLYING TREATMENT MATERIALS TO FOODSTUFFS

TECHNICAL FIELD OF THE INVENTION

The present invention is directed to foodstuff processing using various types of treatment materials including gaseous and liquid ammonia, and ammonia in solution with water. In particular, the present invention includes processes which manipulate the temperature of the foodstuff to facilitate treatments with strong treatment materials, especially strong ammonia-based treatment materials. The invention encompasses both treatment methods and apparatus for treating foodstuffs.

BACKGROUND OF THE INVENTION

Ammonia has been used in several different types of foodstuff treatments. For example, U.S. Pat. No. 3,023,109 to Hines shows treating fresh red meat products with ammonia gas to improve the red color of the uncooked meat. Inventor's certificate SU528923 to Smol' skii et al. discloses a process in which the ammonia gas or aqueous ammonia is applied to fresh meat products to help improve the storage life of the uncooked meat products at temperatures above freezing. Japanese patent No. Sho 64-39965 by Nakayama discloses that gaseous or aqueous ammonia may be used to remove undesirable odors from fresh fowl meat. Ammonia is also known to provide an antimicrobial effect in meat products as indicated in U.S. Pat. No. 5,871,795 to Roth. Ammonia has also been used to treat other types of foodstuffs as shown in U.S. Pat. No. 5,082,679 to Chapman. The Chapman patent shows a process which uses ammonia to detoxify grains that have been contaminated with aflatoxin.

Although ammonia-based treatment materials (such as gaseous and aqueous ammonia) and other treatment materials are known to provide beneficial effects in foodstuffs, there are problems associated with treating foodstuffs with such materials. One problem associated with the application of ammonia-based treatment materials to meat products is that ammonia can change the texture of the meat. Another problem is that ammonia-based material treatments can leave an undesirable ammonia odor in the meat product. U.S. Pat. No. 5,871,795 to Roth discloses a treatment process in which a relatively high ammonia gas pressure is used to reduce the treatment times and thereby avoid imparting an ammonia odor to the treated meat and avoid undesirable changes in the texture of the treated meat while still providing a desirable antibacterial effect. U.S. Pat. No. 6,142,067 to Roth discloses a system in which problems from ammonia treatments for highly comminuted meat are avoided by sparging the ammonia-based treatment fluid into a stream of comminuted meat product and then further comminuting the meat product. This sparging and comminuting arrangement has been shown to better distribute the ammonia treatment material in the meat product and to avoid leaving an ammonia odor in the meat. U.S. Pat. Nos. 7,093,973 and 7,322,284 to Roth show other types of sparging devices for applying ammonia-based treatment material and other pH modifying materials to a stream of highly comminuted foodstuff. U.S. Pat. No. 6,713,108 to Roth discloses a treatment process in which meat products are exposed to ammonia gas and a mechanical action is then applied to avoid producing an ammonia odor in the treated meat product. For larger cuts of meat, U.S. Pat. No. 6,387,426 to Roth discloses applying an ammonia-based treatment material to the surface of a meat product and then employing pressure in a controlled environment to drive the treatment material in to the meat product without over treating.

The above-described prior art processes for applying an ammonia-based treatment material to foodstuffs generally employ two techniques to address the problem of ammonia odor in the treated product. One technique is to limit the time of contact between the foodstuff and the treatment material. The other technique is to apply mechanical action to drive the ammonia-based treatment material into the foodstuff so that the treatment material is bound within the foodstuff. Although these techniques are effective for some applications, they are limited to relatively low concentrations of ammonia in the treatment material. It may be desirable, however, to apply relatively concentrated ammonia-based treatment materials to foodstuffs in order to obtain an enhanced antimicrobial effect. For example, for foodstuffs such as meat products which are injected with brines, it is desirable to eliminate live bacteria at the product surface prior to brine injection in order to reduce the risk of inadvertently carrying surface bacteria into the interior of the meat product with the injection needles. It is also generally desirable to eliminate live bacteria at the surface of a foodstuff that will undergo grinding or further comminuting steps in order to prevent the microbes at the surface of the foodstuff from being spread to other points in the foodstuff in the course of the grinding or further comminuting steps. Although the prior art suggests that ammonia-based treatment materials may be effective for reducing live bacteria counts at the surface of a foodstuff, the problems of excessive ammonia absorption and ammonia odor in the treated product have been limiting factors in the use of ammonia-based treatment materials.

SUMMARY OF THE INVENTION

The present invention provides methods in which treatment materials, even highly concentrated antimicrobial treatment materials such as those with very high ammonia concentrations, may be applied to foodstuffs without producing deleterious effects in the foodstuffs. The high concentration, that is, strong treatment material may be applied according to the invention by controlling the temperature of the foodstuff at or immediately after the time of contact with the treatment material. In particular, the invention includes maintaining ice crystals at or just below the surface of the foodstuff at or immediately after the time of contact with the treatment material.

A first preferred method according to the present invention includes applying a low-temperature treatment material (sometimes referred to herein simply as "treatment material") such as ammonia in liquid form with or without impurities such as water and other materials, or a low-temperature aqueous ammonia solution. The low-temperature treatment material is at a temperature sufficiently low to substantially immediately freeze the surface of the foodstuff to which the treatment material is applied. The term "freeze" is used here and elsewhere in this disclosure and the accompanying claims to refer to a state in which ice crystals (water crystals) are present in the given material. It is believed that the ice crystals at the surface of the foodstuff limits or slows the penetration and absorption of the treatment material into the interior of the foodstuff, that is, beyond the surface of the foodstuff and perhaps beyond a very thin layer just below the surface of the foodstuff. Although the treatment material is not absorbed deeply into the foodstuff, the treatment material provides a very effective microbial control at the surface of the foodstuff.

As used in the present disclosure and the accompanying claims, the phrase "substantially immediately" with reference to freezing a material means no more than approximately one to ten seconds, and more preferably no more than one second at a given point of contact between the treatment material and the surface of the foodstuff. Thus the surface of the foodstuff is frozen by contact with the low-temperature treatment material as described in the preceding paragraph in no more than approximately one second to ten seconds. This freezing at the surface of the foodstuff includes the formation of ice crystals in the mass of the foodstuff itself and may also include the formation of ice crystals in naturally occurring or added water residing at the surface of the foodstuff but not permeated or incorporated into the mass of the foodstuff. As will be discussed further below in the description of illustrative embodiments section, a liquid ammonia treatment material may be at a temperature of below $-28°$ F. at the time it is applied to the foodstuff according to the present invention, and this temperature is sufficient to instantaneously freeze the material at the surface of the foodstuff where the foodstuff had previously been held at a temperature above the freezing temperature of the foodstuff. Other treatment materials that may be used according to this first form of the invention may include cryogenic materials at temperatures significantly below $-28°$ F. Aqueous ammonia solutions and other treatment material solutions may be at a higher temperature, but still low enough to produce the desired freezing at the surface of the foodstuff. As used in this disclosure and the accompanying claims the "freezing temperature" of a foodstuff is the temperature at which ice crystals begin to form in the foodstuff at the given pressure conditions. For example, the freezing temperature of untreated beef at atmospheric pressure is typically around $27°$ F. This temperature is somewhat lower than the freezing temperature of water due to dissolved materials in the water contained in the beef.

In addition to contacting the foodstuff with a low-temperature treatment material to substantially immediately freeze the surface of the foodstuff, the first preferred method then includes removing residual treatment material from contact with the foodstuff. Removing residual treatment material from the surface of the foodstuff may be accomplished in a number of different ways as will be described below in the description of illustrative embodiments section. For example, the treated foodstuff may be held such that excess liquid treatment material drains away from the foodstuff. As another example, a suitable rinsing fluid may be applied to the treated foodstuff to displace residual treatment material away from the foodstuff. As will be discussed below, the step of applying a rinsing fluid may also be performed to not only displace residual treatment material but also to remove treatment material that may have been absorbed into the foodstuff near the foodstuff surface.

A second preferred form of the invention includes maintaining a foodstuff to be treated in a frozen state at least at the surface of the foodstuff, and then applying a treatment material to the frozen surface of the foodstuff. Because the surface of the foodstuff is in a frozen state at the time the treatment material is applied, the treatment material need not be at a temperature below the freezing temperature of the foodstuff. Suitable treatment materials for this second form of the invention include gaseous ammonia, an aqueous ammonia solution, liquid ammonia, and other suitable liquids or gases carrying various types of treatment agents such as antimicrobial agents. As with the first preferred form of the invention, it is believed the presence of ice crystals in the foodstuff prevents undesirable absorption of the treatment material into the foodstuff, that is, absorption into the foodstuff beyond a level at which the treatment material may be readily removed from the foodstuff by rinsing or by some other treatment material removal technique.

A third preferred method according to the present invention applies a treatment material to a foodstuff when the foodstuff is maintained in a surface treatment condition in which a subsurface layer of the foodstuff is frozen while a thin surface layer remains unfrozen. Because the frozen layer is present in the foodstuff to limit the penetration of the treatment material, the treatment material need not be applied at a temperature below the freezing temperature of the foodstuff in this form of the invention. The treatment material may comprise liquid ammonia, gaseous ammonia, an aqueous ammonia solution, or other liquid or gas carrying a suitable treatment agent such as an antimicrobial agent.

Methods according to the present invention facilitate the application of even strong/high concentration treatment material to the surface of the foodstuff. This application of strong treatment material may produce a very high rate of kill of microbes that may be present at the surface of the foodstuff, including pathogens such as *Listeria* and *Salmonella* bacteria, and pathogenic strains of *E. Coli* bacteria. Yet the treatments prevent excessive absorption of the treatment material into the foodstuff, and thus prevent deleterious effects in the foodstuff such as an undesirable odor or taste.

The effective kill of microbes at the surface of a foodstuff is beneficial for foodstuffs that are ground or otherwise cut down into smaller pieces. The reduction in microbes at the surface of the larger starting pieces of foodstuff reduces the possibility of microbes being spread to the surfaces of the comminuted product during the comminution process. The reduction of microbes at the surface of a foodstuff is also particularly beneficial for foodstuffs which are later injected using injection needles which penetrate through the surface of the foodstuff and extend into the foodstuff interior. This includes many types of meat products such as formed meat products that are produced from small pieces of meat and other materials, and such as intact meat products including primal cuts of meat, steaks, roasts, or whole carcass sections of beef, lamb, poultry, and fish. As used herein the term "intact meat product" means a meat product other than ground or otherwise highly comminuted meat, and thus includes steaks, roasts, filets, and cubed meat down to a minimum dimension of between one-half and one-quarter inch. The effective microbe kill at the surface of the foodstuff prior to injection reduces the risk that the injection needles will carry microbes into the interior of the meat product where the microbes are more difficult to kill by cooking.

An apparatus for treating a foodstuff according to the first preferred embodiment described above includes a supply vessel containing the treatment material at an operating temperature below the freezing temperature of the foodstuff to be treated. The apparatus further includes a treatment material contacting device for bringing treatment material from the treatment material supply and at the operating temperature into contact with a surface of the foodstuff. In addition to the treatment material supply vessel and contacting device, an apparatus according to this form of the invention may further include a separate treatment material removal device for removing residual treatment material from the foodstuff. Also, because the treatment is particularly useful for foodstuffs that are to be injected, the apparatus may include an injection device for receiving the foodstuff immediately or soon after the ammonia treatment. Other forms of the invention may include a cutting station interposed between the ammonia contacting device and the injection device for cutting the treated foodstuff into smaller segments prior to injection. Such cutting may be employed particularly where the foodstuff to which ammonia is applied comprises a relatively large cut of meat such as a primal cut for example.

An apparatus for performing the methods according to the second and third embodiments is similar to that described in the preceding paragraph except that the supply vessel need not contain the treatment material at the operating temperature below the freezing temperature of the foodstuff. Rather, the treatment material supply vessel may contain liquid ammonia, gaseous ammonia, an ammonium hydroxide solution (aqueous ammonia), or other liquid or gas which is or includes an antimicrobial agent. Another difference is that the apparatus may include a freezing device for freezing the foodstuff to be treated prior to contact with the ammonia-base treatment material. An apparatus adapted to perform the third preferred method described above may also include a thawing device for thawing the foodstuff to produce the desired thin unfrozen surface layer prior to contact with the treatment material.

These and other advantages and features of the invention will be apparent from the following description of the preferred embodiments, considered along with the accompanying drawings.

DESCRIPTION OF ILLUSTRATIVE EMBODIMENTS

The claims at the end of this application set out novel features which the Applicants believe are characteristic of the invention. The various advantages and features of the invention together with preferred modes of use of the invention will best be understood by reference to the following description of illustrative embodiments read in conjunction with the drawings introduced above.

Figure 1:
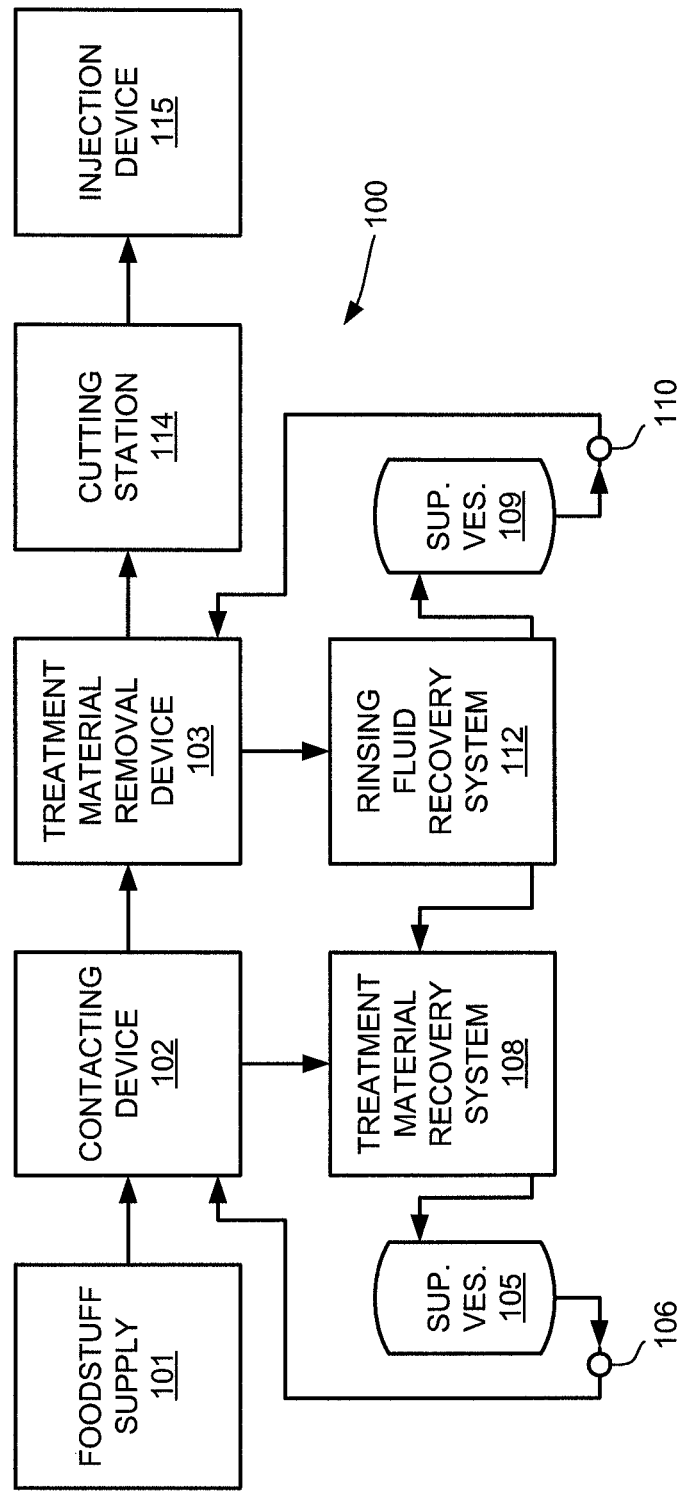
FIG. 1 is a diagrammatic representation of a foodstuff treatment apparatus according to one preferred form of the present invention.

FIG. 1 shows an apparatus 100 for treating foodstuffs with a treatment material according to one preferred form of the invention. The particular apparatus 100 shown in FIG. 1 is well suited for a treatment method in which a low-temperature treatment material is brought into contact with the foodstuff to be treated to substantially immediately freeze the surface of the foodstuff. Residual treatment material is then removed from the foodstuff prior to storage, packaging, or further processing such as brine injection and/or cutting into smaller foodstuff segments.

Apparatus 100 includes a foodstuff supply 101, a contacting device 102, and a treatment material removal device 103. Contacting device 102 receives low-temperature treatment material from a treatment material supply vessel 105 through pump 106. A treatment material recovery system 108 is included for recovering treatment material from contacting device 102 and returning recovered treatment material to supply vessel 105. Rinsing fluid supply vessel 109 supplies a rinsing fluid to treatment material removal device 103 through pump 110. A rinsing fluid recovery system 112 is included in apparatus 100 for recovering rinsing fluid and treatment material from treatment material removal device 103. Apparatus 100 further includes a cutting station 114 and injection device 115.

Numerous different types of foodstuffs may be treated with apparatus 100 including vegetables, grains, meats, and by-products of these foodstuffs. Meats that may be treated with a low-temperature treatment material include beef, veal, pork, lamb, mutton, poultry, and fish and other seafoods. Apparatus 100 is particularly suited for treating primal cuts of meat and other large sections of meat that may be trimmed into smaller cuts of meat prior to injection with a suitable brine. Apparatus 100 is also well suited for treating formed meat products that are formed from meat batters or relatively small pieces of meat that are pressed or otherwise formed into some desired shape. The present invention contemplates that the foodstuff to be treated is not cooked or otherwise denatured, however, it may be possible to treat fully or partially denatured foodstuffs according to the present invention in apparatus 100. Cutting station 114 and injection device 115 are included in apparatus 100 for cutting and injection operations, respectively. However, both the cutting operations and the injection operations are tangential to the treatment according to the invention, and thus an apparatus according to the invention need not include cutting station 114 and injection device 115, or may include those elements in an order different from that shown in FIG. 1.

Although not shown in FIG. 1, a conveyor or other arrangement may be included in apparatus 100 for conveying the foodstuff from one element to the next in the apparatus. Any suitable conveyor or conveying arrangement may be used. Other forms of apparatus 100 may include no conveying arrangement between at least some of the elements in the apparatus. For example, foodstuffs to be treated may be moved manually from foodstuff supply 101 to contacting device 102. Even where conveyors are used, some manual steps may be required to move foodstuffs from one conveyor to another in apparatus 100.

Foodstuff supply 101 may be any suitable device for temporarily storing foodstuffs prior to transfer to contacting device 102. The nature of foodstuff supply 101 will depend upon the nature of the foodstuff being treated and upon the manner in which the foodstuff is transferred to contacting device 102. For example, where the foodstuff to be treated comprises cuts of meat (such as individual steaks or roasts, or perhaps primal cuts), foodstuff supply 101 may include a suitable refrigerated chamber for maintaining the meat at the desired temperature prior to transfer to contacting device 102. Preferred temperatures for treating steaks, roasts, or primal cuts of meat in contacting device 102 may range from approximately 45° F. to approximately 29° F. for this embodiment of the invention, and thus foodstuff supply 101 may maintain the meat at some temperature within this range. However, contacting device 102 may apply the low-temperature treatment material to foodstuffs that are at significantly higher temperatures in some cases. For example, the foodstuff to be treated may comprise a substantially whole animal carcass immediately after slaughter and prior to any significant chilling. In this case the foodstuff may be at a temperature of approximately 105° F. to 115° F. both in foodstuff supply 101 (which may comprise a slaughter floor for example) and at the time the low-temperature treatment material is applied in contacting device 102. In still other embodiments for treating meat products, contacting device 102 applies the low-temperature treatment material to meat products at some intermediate point between the slaughter temperature and cold storage temperature, and foodstuff supply 101 may be a device adapted to maintain that intermediate temperature.

Contacting device 102 receives foodstuffs to be treated from foodstuff supply 101 and receives the low-temperature treatment material from treatment material supply vessel 105, and places at least part of the surface of the foodstuff in contact with the low-temperature treatment material. Placing the foodstuff in contact with the low-temperature treatment material may include, for example, spraying the foodstuff with liquid ammonia or low-temperature aqueous ammonia, immersing the foodstuff in either of these materials or washing or rinsing the foodstuff with either of these materials. A specific example of a spraying arrangement will be described below in connection with FIG. 2, while specific examples of immersion arrangements will be described below in connection with FIGS. 3 and 4. Regardless of the particular contacting arrangement used in contacting device 102, the contacting device preferably includes a chamber (not shown) for containing the foodstuff being treated and the treatment material and materials that may escape from the treatment material and facilitate recovery of those materials as described below. The chamber may be open-ended to facilitate entry and removal of foodstuffs to be treated, or may include some sealing arrangement that allows entry and removal of foodstuffs to be treated but may be sealed while the foodstuff is being treated. In either case, but particularly where an open-ended chamber is employed, a vacuum may be applied to the treatment chamber to help contain treatment material and gases emanating from the treatment material in the course of contacting the foodstuff.

Particularly in the case where a contacting device 102 sprays low-temperature treatment material onto the foodstuff, excess liquid treatment material may collect in a suitable liquid collection pan that may be included in contacting device 102. The collected liquid treatment material is then transferred by suitable means to treatment material recovery system 108. Treatment material recovery system 108 may include filtering devices and separating devices for removing impurities that may have been picked up by the treatment material in contacting device 102. The filtered and separated liquid treatment material obtained through treatment material recovery system 108 may then be returned to treatment material supply vessel 105 for further use in the system. In addition to filters and separators, treatment material recovery system 108 may include equipment for chilling gas that may be collected through a treatment material gas collection system (not shown) associated with contacting device 102 to return the gas to a liquid state. For example, where the treatment material is liquid ammonia, some of the liquid may phase change to gas in the contacting device, and a vacuum may be applied to the treatment chamber to collect this ammonia gas so that it may be chilled and returned to liquid form for further use in the system. Where the treatment material is an aqueous ammonia solution, ammonia recovery system 108 may include a sparging or other arrangement for placing collected ammonia gas in contact with collected aqueous ammonia solution and a chilling device for returning recovered aqueous ammonia to a desired operating temperature and encouraging the take up of sparged ammonia gas into solution. Treatment material supply vessel 105 will also typically include a chilling arrangement for maintaining the temperature of the treatment material at or near the desired operating temperature, for example, below −28° F. for pure ammonia at atmospheric pressure. Chilling to the desired temperature for contact with the foodstuff to be treated may also or alternatively be accomplished by a suitable device interposed between supply vessel 105 and contacting device 102, or in the contacting device itself. Higher liquid ammonia temperatures (above −28° F.) may be used in supply vessel 105 and in contacting device 102, however, unless the ammonia is held in solution with water it will be necessary to maintain a sufficient pressure in the supply vessel and contacting device to ensure the ammonia stays in liquid form at the desired temperature. In any event, the temperature of the low-temperature treatment material contacted with the foodstuff at contacting device 102 in this form of the invention must be at a temperature sufficiently low to produce the desired substantially immediate freezing upon contact with the foodstuff to be treated. This may be a temperature only slightly lower than the freezing temperature of the foodstuff in some cases, for example, approximately 25° F. where the foodstuff is a meat product such as a steak or primal cut held at just above the freezing temperature of the meat. Of course, the temperature and nature of the foodstuff must be considered when selecting the temperature of the treatment material applied to the foodstuff in contacting device 102. The higher the temperature of the foodstuff at the time treatment material is applied in contacting device 102, the lower the temperature of the treatment material necessary to produce the desired freezing in the foodstuff. Liquid ammonia at approximately −28° F. may be used to substantially instantaneously freeze the surface of even a relatively hot foodstuff (approximately 115° F. for example) on contact, however, lower temperatures such as −80° F. or below might be preferred to reduce contact time between the liquid ammonia and the foodstuff and may be better from a material handling and recovery standpoint. Also, the fat content in a meat product affects the desired operating temperature for the treatment material in this form of the invention because fat insulates adjacent meat fibers and thereby retards the formation of ice crystals in the meat fibers. In any event, there should be a sufficient differential between the temperature of the foodstuff being treated and the temperature of the treatment material to produce the desired immediate freezing in the foodstuff to a depth of at least ten one-thousandths of an inch (0.010 inch) below the surface of the foodstuff.

The contact time between the low-temperature treatment material and the foodstuff in contacting device 102 will depend on a number of factors, including the type of foodstuff being treated, the size of the foodstuff, the temperature of the foodstuff, the temperature of the treatment material, and the processing steps that are to follow the treatment material contact. Generally, the lower the temperature differential between the treatment material and the foodstuff, the longer the contact time needed to produce the desired ice crystals in the foodstuff. However, the contact time before ice crystal formation should not be so long as to allow excessive absorption of the treatment material into the foodstuff. On the other hand, the contact time with the low-temperature treatment material should not be so long that undesirable freezing occurs in the foodstuff. For example, it may be desirable to inject the foodstuff very quickly after contact with the treatment material, and in this case, it would be undesirable to leave the foodstuff in contact with a very low temperature treatment material (for example −80° F.) for so long that foodstuff is frozen too thoroughly for immediate injection.

Although pure liquid ammonia is one preferred treatment material for this first preferred form of the present invention, other materials may be included in the treatment material. For example, liquid water may be included with liquid ammonia at some treatment temperatures, although the liquid water will quickly dissolve ammonia to produce a strong aqueous ammonia solution together with the liquid ammonia. Also, the treatment material for this first preferred form of the invention may comprise an aqueous ammonia solution that has sufficient material in solution in the water to depress the freezing point of the solution to a suitable temperature below the freezing point of the foodstuff. Gases such as nitrogen may also be included with the liquid ammonia treatment material or aqueous ammonia treatment material. Another low-temperature treatment material that may be employed in the present invention comprises a cryogenic liquid such as propylene glycol mixed with sufficient liquid ammonia or other antimicrobial agent to provide the desired antimicrobial effect. A low-temperature treatment material within the scope of the present invention may also include a solid material entrained in a liquid or gas, or a solid material in the form of a powder or in some other suitable form.

Treatment material removal device 103 is included in apparatus 100 for removing residual treatment material (and gases that may be released from liquid treatment materials) from contact with the foodstuff after the treatment material has been applied in contacting device 102. The purpose of removing the residual treatment material is to prevent excessive absorption of the treatment material into the foodstuff as the foodstuff is stored or is processed through additional equipment in apparatus 100 such as cutting station 114 and injection device 115. It is also desirable to recover as much treatment material as possible in order to make more efficient use of the treatment material and to avoid excessive release from apparatus 100 in the course of operation. The residual treatment material removed in device 103 includes excess treatment material that remains in contact with the foodstuff after the desired freezing at the surface of the foodstuff, and also includes treatment material that is absorbed into the foodstuff at or just below the foodstuff surface. The gas to be removed comprises any gas included in the treatment material and any gas that goes to a gaseous state in contacting device 102 as the treatment material is applied.

The invention encompasses numerous different types of arrangements for removing residual treatment material remaining on or around the foodstuff after contacting device 102. Although a treatment fluid removal device may simply include a device which holds the treated foodstuff so that excess liquid treatment material drains away from the foodstuff, the preferred arrangement shown in FIG. 1 includes rinsing the foodstuff with a suitable rinsing fluid comprising any suitable gas or liquid. One preferred rinsing fluid includes water supplied from supply vessel 109. Other rinsing fluids may include a neutralizing material such as carbon dioxide gas or carbonic acid solution. Regardless of the rinsing fluid employed in treatment material removal device 103, the device includes one or more nozzles or emitters for spraying or otherwise applying the rinsing fluid onto the foodstuff to displace liquid ammonia remaining at the foodstuff surface. Alternatively or in addition to spray nozzles or emitters, treatment material removal device 103 may include an arrangement for producing a flowing sheet of liquid rinsing fluid that flows over the foodstuff after the foodstuff has been contacted with the desired low-temperature treatment material. Also, treatment material removal device 103 preferably includes a chamber (not shown) in which the rinsing fluid is applied to the foodstuff. This chamber contains the rinsing fluid and recovered treatment material and gas for removal to rinsing fluid recovery system 112. As with the chamber used in contacting device 102, the chamber used for treatment material removal device 103 may be open-ended and rely on a vacuum to help contain gasses from the rinsing material and removed treatment material. Alternatively, the chamber used for treatment material removal device 103 may be sealable to produce a temporary sealed area around the foodstuff and in which the rinsing material may be applied. It should also be noted that while contacting device 102 and treatment material removal device 103 are shown in FIG. 1 as separate and distinct devices, they may be combined as a single element or at least share common components. For example, treatment material contacting and removal may be conducted in a single chamber.

Rinsing fluid recovery system 112 preferably includes apparatus suitable for separating treatment material from the rinse fluid and filtering the rinsing fluid prior to return to rinse supply vessel 109. Treatment material recovered in rinsing fluid recovery system 112 may be transferred to either treatment material recovery system 108 or treatment material supply vessel 105 for recycling through the system. The specific equipment included in rinsing fluid recovery system 112 will depend upon the treatment material and the particular rinsing fluid selected for removing residual treatment material. For example, where the rinsing fluid comprises liquid water and the treatment material includes gaseous or liquid ammonia, the water not only displaces liquid ammonia from the surface of the foodstuff in treatment fluid removal device 103 but also takes up ammonia by dissolution. The water and dissolved ammonia may collect in a suitable drain pan in treatment fluid removal device 103 and simply drain to rinsing fluid recovery system 112 where the solution may be filtered and then held under conditions to allow the treatment material to escape from the water. Where the rinsing fluid comprises a gas, the gas may be removed by vacuum from treatment material removal device 103 and pumped or otherwise directed to rinsing fluid recovery system 112 for filtering and conditioning. One advantage of using a gaseous rinsing fluid where the treatment material is liquid ammonia is that the temperature of the gas may be held low enough to maintain residual liquid ammonia on the foodstuff in liquid form as it is rinsed away from the foodstuff. This may prevent the surface of the foodstuff from warming up sufficiently to allow the residual ammonia to be undesirably absorbed into the foodstuff. The residual liquid ammonia rinsed from the foodstuff with a cold gas rinsing material may collect in treatment material removal device 103 for transfer either to rinsing fluid recovery system 112 or directly to treatment material recovery system 108/treatment material supply vessel 105.

It should be noted that although FIG. 1 shows an arrangement for supplying a rinsing fluid to rinse residual treatment material away from the foodstuff, other techniques may be employed for removing residual ammonia. For example, some forms of the invention may include a device that applies low energy microwave or infrared radiation to the treated foodstuff to help liberate residual ammonia from the foodstuff. In either case heat energy from the electromagnetic radiation causes ammonia to be released in gaseous form. The released ammonia gas may then be removed from the chamber associated with device 103 by vacuum or by displacement using another gas such as nitrogen or air. Furthermore, treatment material removal may be accomplished by immersing the treated foodstuff in a rinsing liquid. An apparatus such as that shown in FIG. 4 may be used for removing treatment material by immersion in a rinsing liquid. Also, combinations of removal techniques may be employed within the scope of the invention. For example, treatment material removal may include a first rinsing step with a low-temperature gas to remove residual treatment liquid from the surface of the foodstuff, and then a second rinsing step with liquid water. Microwave or infrared radiation may be applied in addition to rinsing either with a spraying device or by immersion.

Cutting station 114 is included in apparatus 100 for applications in which the foodstuff treated in contacting device 102 is cut down into smaller pieces prior to injection using injection device 115. In particular, cutting station 114 may be used where the foodstuff comprises relatively large cuts of meat which are later cut down into smaller cuts of meat prior to injection with a brine. Such large cuts of meat may be referred to herein as intact meat products and include whole carcasses or sides, primal cuts, roasts, steaks, and cubed meat down to a minimum dimension of about one-quarter to one-half inch. For example, cutting station 114 may comprise a meat cubing device that cuts the treated meat down into cubes as small as one-quarter to one-half inch cubes. As another example, cutting station 114 may comprise a device or an area in which primal cuts of meat which have been treated in contacting device 102 are cut into smaller pieces such as steaks as thin as three-eighths of an inch thick prior to injection in injection device 115. It will be appreciated that cutting station 114 may not comprise a fully automated device and may simply comprise an area in which workers manually cut the treated meat product prior to further treatment in injection device 115. Also, a combination of manual operations and automated operations may be performed at cutting station 114 in order to cut the treated foodstuff into the desired pieces. Regardless of how the foodstuff is cut into smaller segments at cutting station 114, the surface microbe kill provided by the present invention helps reduce the risk that microbes will be spread in the foodstuff in the course of the cutting operations.

Injection device 115 shown in FIG. 1 is included in apparatus 100 to inject a suitable fluid into the foodstuff that has previously been treated in contacting device 102. Such an injection device has particular application for meat products that are first treated in contacting device 102 to kill bacteria residing at the surface of the meat product. The microbe kill provided by the treatment material contact at contacting device 102 helps reduce the risk of the injection device spreading live microbes from the surface of the product into the interior of the meat product. Although FIG. 1 shows injection device 115 after cutting station 114 in the process flow, other forms of the invention may inject the foodstuff immediately after surface treatment, and then cut the treated foodstuff into smaller pieces. Thus injection device 115 may be placed before cutting station 114 in some applications of the invention. In any event, injection device 115 may comprise any suitable injection device, including the injection devices described in U.S. Pat. No. 7,022,361 which is incorporated herein by this reference. Further detail of injection device 115 is omitted from this disclosure so as not to obscure the present invention in unnecessary detail.

Figure 2:
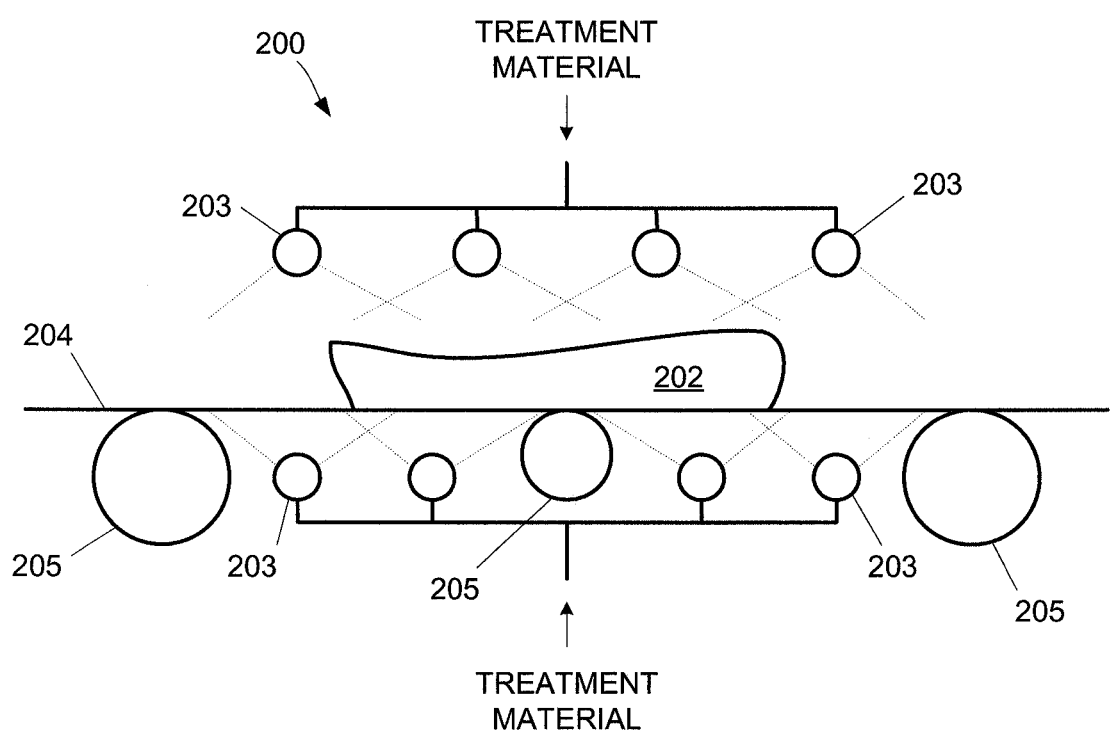
FIG. 2 is a diagrammatic representation of one preferred contacting device that may be employed in the system shown in FIG. 1.

FIG. 2 illustrates one preferred low-temperature treatment material contacting system 200 that may be included in contacting device 102 shown in FIG. 1. System 200 applies the low-temperature treatment material such as liquid ammonia or aqueous ammonia to the surface of the foodstuff 202 held in a contact area of the device by spraying the treatment material onto the foodstuff through a number of spray nozzles 203. Foodstuff 202 is supported in the contact area on a suitable support structure such as a conveyor belt 204, which is carried by conveyor belt rollers 205. It will be appreciated that conveyor belt 204 is preferably an open link type belt that exposes the bottom surface of foodstuff 202 to the spray of treatment material from the lower spray nozzles 203. However, it may be possible to eliminate the lower nozzles 203, that is, the nozzles spraying the bottom surface of meat product 202.

The example treatment material contacting system 200 shown in FIG. 2 may be operated in a number of different ways within the scope of the present invention. In one arrangement, conveyor belt 204 is caused to stop with foodstuff 202 in the contact area in the position shown in FIG. 2, and then spray nozzles 203 are activated to spray the treatment material onto the foodstuff. The spray from nozzles 203 may then be momentarily stopped while conveyor belt 204 is operated to place another foodstuff in the position shown in FIG. 2. Alternatively to this intermittent spray, spray nozzles 203 may be operated continuously as foodstuffs are conveyed through the contact area of the contacting device. In yet other spray arrangements, a single elongated and transversely mounted spray nozzle or other emitter may be positioned above the foodstuffs along the conveyor belt path and a single spray nozzle or other emitter may be positioned below the conveyor belt path. Complete surface coverage is produced in this arrangement by running the spray nozzles/emitters continuously as foodstuffs pass between them on conveyor belt 204. Another "emitter" may, for example, include a device that produces a flowing sheet or curtain of treatment material that falls on the foodstuff as it is carried along the process path by a suitable structure. Also, other forms of the invention may not spray the foodstuff while carried on a conveyor belt such as belt 204 in FIG. 2. For example, other forms of the invention may suspend a meat product on a hook or other supporting device in position to be sprayed with a low-temperature treatment material according to the invention.

Figure 3:
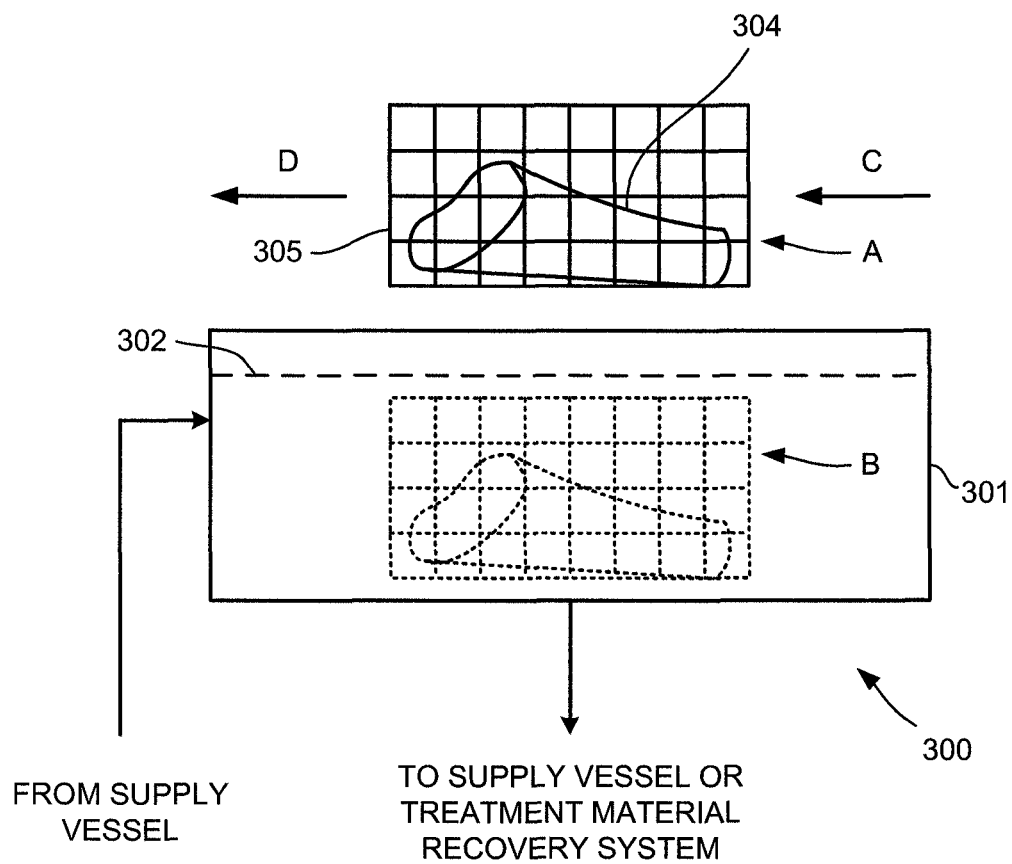
FIG. 3 is a diagrammatic representation of an alternate preferred contacting device that may be employed in the system shown in FIG. 1.

Alternate contacting systems within the scope of the invention may not use spray nozzles or other emitting devices at all but rather cause the foodstuffs to be immersed momentarily in a liquid low-temperature treatment material such as liquid ammonia or aqueous ammonia. FIG. 3 shows a first immersion-type system 300 that may be used as contacting device 102 in FIG. 1 to apply liquid ammonia or some other liquid treatment material to a foodstuff. Immersion-type system 300 includes an immersion vessel 301 containing the liquid treatment material. The upper surface of the liquid treatment material is shown at dashed line 302 in FIG. 3. Although the immersion vessel 301 may be used as a supply vessel, some forms of the immersion-type system circulate the liquid treatment material from immersion vessel 301 to the treatment material supply vessel (such as vessel 105 in FIG. 1) for filtering and reconditioning. Alternatively, liquid treatment material from immersion vessel 301 may be circulated first to a treatment material recovery system such as system 108 shown in FIG. 1 and then to supply vessel 105. This circulation is indicated in FIG. 3 by the line labeled "TO SUPPLY VESSEL OR TREATMENT MATERIAL RECOVERY SYSTEM." In either of these cases in which liquid treatment material is removed from immersion vessel 301 for conditioning, the treatment material is supplied to the immersion vessel from a suitable treatment material supply vessel such as vessel 105 in FIG. 1.

In addition to immersion vessel 301, immersion-type system 300 in FIG. 3 includes an arrangement for placing the foodstuff 304 in the liquid treatment material in the immersion vessel. The arrangement shown in FIG. 3 includes an open or closed top wire cage 305 in which foodstuff 304 may be placed and then immersed in the liquid ammonia in immersion vessel 301. The foodstuff 304 and cage 305 shown in phantom lines in FIG. 3 show an immersed position (position B) while the foodstuff 304 and cage 305 shown in solid lines (position A) represent the position before immersion and after removal from the liquid treatment material. In FIG. 3, foodstuff 304 and cage 305 are moved to position A as indicated by arrow C. After immersion to position B and return to position A, foodstuff 304 and cage 305 are moved away from immersion vessel 301 as indicated by arrow D in FIG. 3. Because numerous different mechanical systems may be used to move foodstuff 304 and cage 305 as shown by arrows C and D and between positions A and B, and because the specific mechanical system selected is not necessary to an understanding of the present invention, FIG. 3 omits the mechanical system for moving foodstuff 304 and cage 305. Those skilled in the art of automated food processing systems will appreciate that the mechanical system for moving foodstuff 304 and cage 305 relative to immersion vessel 301 may move the foodstuff and cage while the immersion vessel remains stationary or may move the immersion vessel while the foodstuff and cage remain stationary. Also, rather than the separate up and down and lateral movement indicated in FIG. 3, a mechanical system suitable for momentarily immersing a foodstuff in the liquid treatment material may include a conveyor flight that carries the foodstuff along a path that traverses immersion vessel 301. For example, a cage such as cage 305 or simply a hook for supporting a foodstuff such as foodstuff 304 may be suspended from a continuous chain conveyor which follows a path to dip the cage or hook into a treatment liquid in a suitable immersion vessel and then remove the cage or hook after a suitable contact time between the foodstuff and liquid treatment material determined by the speed of the conveyor.

Figure 4:
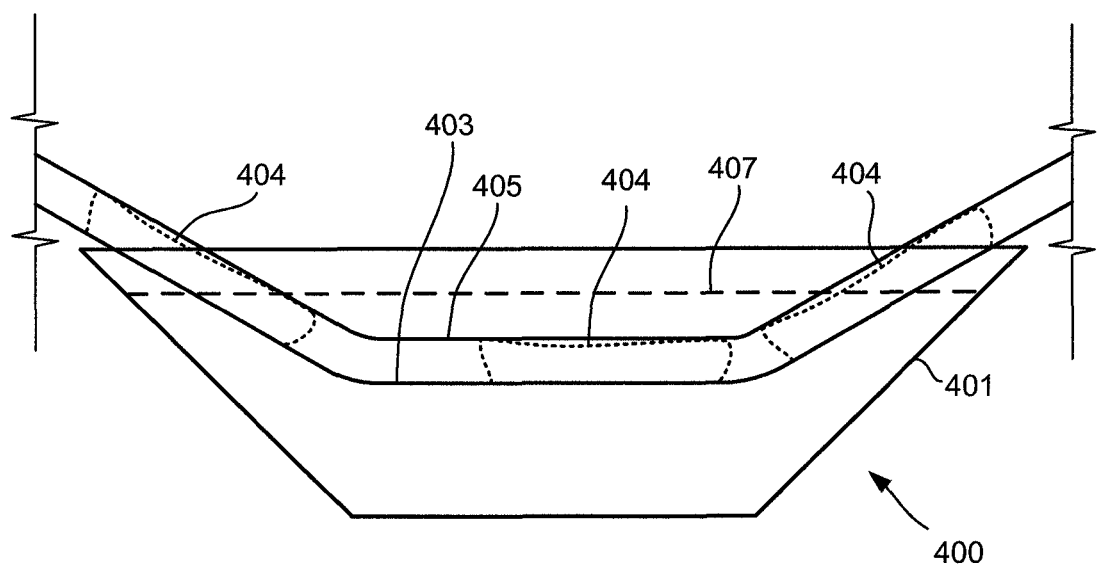
FIG. 4 is a diagrammatic representation of another alternate preferred contacting device that may be employed in the system shown in FIG. 1.

FIG. 4 shows an alternate apparatus 400 that may be employed to immerse a foodstuff in a liquid treatment material such as liquid ammonia or aqueous ammonia. Apparatus 400 includes an immersion vessel 401 similar to vessel 301 in FIG. 3. All of the above comments regarding vessel 301 in FIG. 3 apply as well to immersion vessel 401. Unlike the cage dipping arrangement shown in FIG. 3, apparatus 400 includes a conveyor system in which a conveyor flight traverses the liquid held in vessel 401. In particular, the conveyor system shown in FIG. 4 includes a lower conveyor belt 403 on which the foodstuff 404 to be treated is supported, and an upper conveyor belt 405 which helps hold the foodstuff 404 on lower conveyor belt 403 as the foodstuff is carried through the treatment material in vessel 401. The level of the treatment material is shown at dashed line 407 in FIG. 4. Although the dual conveyor arrangement shown in FIG. 4 is preferred, other immersion-type contacting devices may include a single lower conveyor. In any case, the conveyor belts are preferably open link belts that do not significantly interfere with the desired contact between the foodstuff and the liquid treatment material. Only a portion of the flights of conveyor belts 403 and 405 are shown in FIG. 4. Any suitable roller arrangement could be used to position the conveyor belt flights as shown in FIG. 4, or in any other suitable arrangement traversing the liquid treatment material in vessel 401.

Apparatus 100 shown in FIG. 1 may also be employed to apply a treatment material to a foodstuff while the foodstuff is maintained at a surface treatment condition in which the foodstuff is frozen at least at a foodstuff surface to be treated. Because the surface of the foodstuff is already frozen at the time the treatment material is applied to the foodstuff, the treatment material need not be a treatment material such as liquid ammonia or an aqueous ammonia solution at a temperature sufficiently low to freeze the foodstuff substantially immediately on contact. The ice crystals already in the foodstuff at the time the foodstuff is contacted with the treatment material impede or prevent the treatment material from being absorbed too deeply into the foodstuff regardless of whether the treatment material is ammonia gas, liquid ammonia, aqueous ammonia, or some other liquid, gas, or solid treatment material which includes an antimicrobial agent. Apparatus 100 may be employed to maintain the foodstuff in the surface treatment condition and to apply the treatment material to the foodstuff surface while the foodstuff is so maintained.

The temperature to which the foodstuff surface is frozen in this alternate form of the invention and the depth to which the foodstuff is frozen may vary within the scope of the invention. In any case, however, the temperature of the foodstuff surface and the depth of frozen foodstuff below the foodstuff surface should be such that the foodstuff surface is frozen at the time the treatment material is applied, and remains frozen until the residual treatment material may be removed or substantially removed. Thus the depth to which the foodstuff is frozen may be as little as ten thousandths of an inch (0.010 inch), but in this case the foodstuff will have to be contacted quickly with a relatively cool treatment material and then the residual treatment material removed quickly so that residual treatment material does not remain on the foodstuff for any significant period of time after the surface layer thawed either by heat from the interior of the foodstuff or by heat from the treatment material. As another extreme example, the foodstuff surface to be treated may be frozen to a temperature of only approximately $1°$ F. below the freezing temperature of the foodstuff. In this case the treatment material should be applied at a temperature at or below the temperature of the foodstuff in order to prevent significant thawing at the foodstuff surface while ammonia is in contact with the foodstuff surface and before residual treatment material may be removed.

Due to the limitation that the surface of the foodstuff should remain frozen until at least commencement of the step of removing residual treatment material from contact with the foodstuff surface, preferred forms of this alternative treatment process maintain the surface of the foodstuff well below the freezing temperature at the time of treatment material contact and employ a treatment material at a temperature sufficiently low to avoid significant surface thawing prior to commencement of the residual treatment material removal step. For example, where the foodstuff comprises a beef steak, the steak may be completely frozen to a temperature of approximately $25°$ F. or less and the treatment material may comprise aqueous ammonia at a temperature of $25°$ F. or less. Where ammonia gas is used as the treatment material, the temperature of the ammonia gas may be higher and still avoid significant thawing at the foodstuff surface due to the high thermal mass of the foodstuff.

As with the previously described method using a low-temperature treatment material, this alternative method in which the foodstuff is already frozen at the time the treatment material is applied may include removing residual treatment material from the surface of the foodstuff and injecting a suitable brine into the interior of the foodstuff after the surface treatment. The injection needles may be inserted through the foodstuff that was surface-treated. Also as with the previously described method, the surface-treated foodstuff may be reduced to smaller pieces and the injection needles inserted through a surface formed by this cutting procedure.

In the case in which apparatus 100 is used to apply a treatment material to the surface of a previously frozen foodstuff, foodstuff supply 101 in FIG. 1 includes some device for supplying the appropriately frozen foodstuff. Thus foodstuff supply 101 may include a suitable freezer for maintaining the foodstuff to be treated in the desired frozen condition prior to transfer to contacting device 102. In addition to simply maintaining the foodstuff in the desired frozen condition, foodstuff supply 101 may be a freezer suitable for freezing a previously unfrozen foodstuff. For example, foodstuff supply 101 may include a standard freezer for freezing the surface of the foodstuff. As another example, foodstuff supply 101 may include a device for freezing the surface of the foodstuff with a cryogenic liquid such as liquid nitrogen. Alternatively, an apparatus for performing the ammonia treatment on a foodstuff having a frozen surface may not include a freezer but merely some arrangement for feeding a previously frozen foodstuff to contacting device 102.

In the form of the invention in which the treatment material is applied to a foodstuff having a previously frozen surface, contacting device 102 in FIG. 1 may be any suitable device or arrangement for applying an antimicrobial treatment material such as liquid ammonia, aqueous ammonia, or ammonia gas to the frozen surface of the foodstuff. Where a liquid treatment material such as liquid ammonia or aqueous ammonia is used as the treatment material, a spraying device such as that shown in FIG. 2 or an immersion device as shown in FIG. 3 may be used as the contacting device 102 in FIG. 1. Where the treatment material comprises gaseous ammonia or some other gaseous material, a spraying device such as that shown in FIG. 2 may be employed as contacting device 102, or the contacting device may comprise a vessel in which a suitable treatment gas content is maintained while the frozen foodstuff is transported there through. In cases in which a treatment material recovery system 108 is used, the system will comprise a suitable system for recovering and conditioning the particular treatment material employed in contacting device 102. The supply vessel 105 and pump 106 in FIG. 1 would be selected appropriately for the particular treatment material.

Where apparatus 100 is employed to apply a treatment material to a previously frozen surface of a foodstuff, it is still desirable to remove excess treatment material from the foodstuff surface using a suitable treatment material removal device such as 103 in FIG. 1. This device may include a suitable rinsing device as described above in connection with the low-temperature liquid ammonia treatment method. Furthermore, cutting station 114 and injection device 115 may be the same types of devices described above in connection with the low-temperature treatment material process described above.

Figure 5:
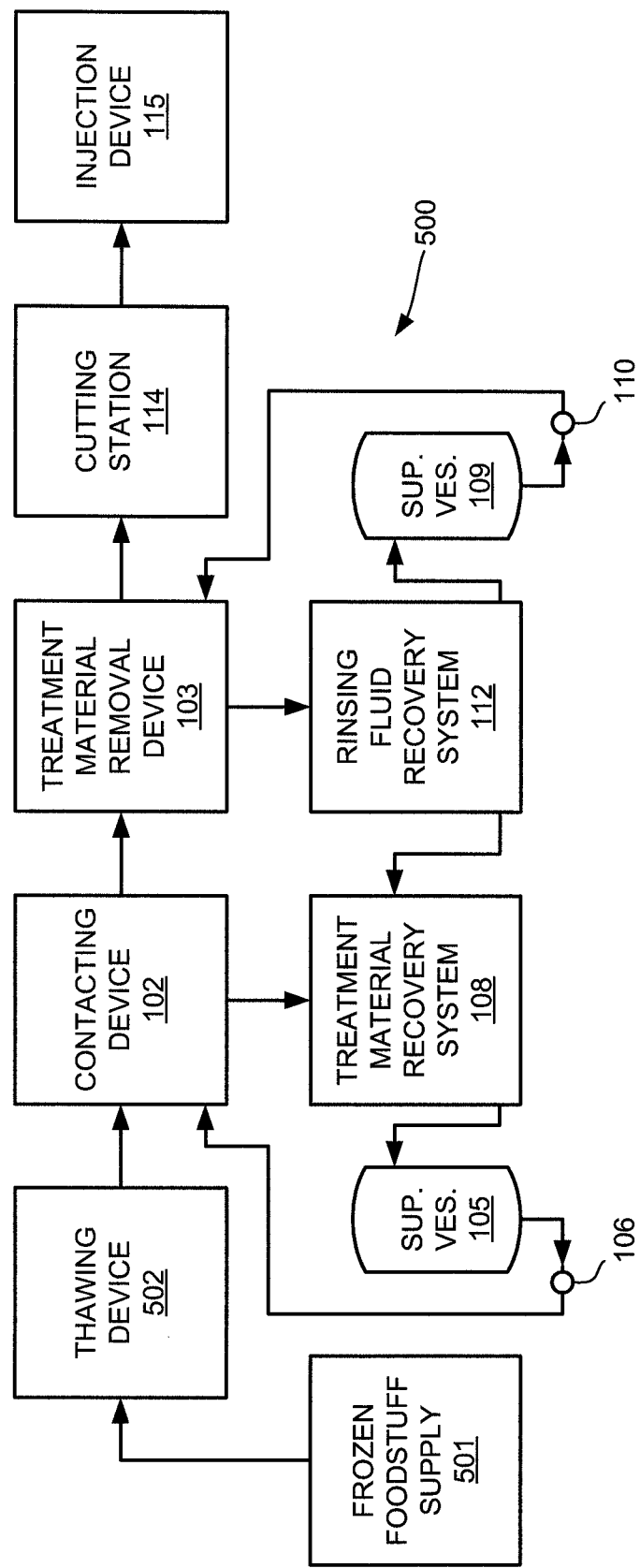
FIG. 5 is a diagrammatic representation of a second foodstuff treatment apparatus according to the present invention.

FIG. 5 shows an apparatus 500 that may be employed to perform another alternate method for applying a treatment material to the surface of a foodstuff. This alternate method includes applying the treatment material to the surface of the foodstuff while the foodstuff is maintained in a surface treatment condition in which the foodstuff includes a frozen layer beneath a foodstuff surface to be treated and an unfrozen surface layer external to the frozen layer. In this alternative form of the invention, the unfrozen surface layer is relatively thin and preferably no more than approximately one-eighth of an inch thick as measured from the foodstuff surface. The surface condition including an unfrozen surface layer above a frozen layer of the foodstuff will be described further below in connection with FIG. 6. As with the alternative described above in which the surface of the foodstuff is frozen, the treatment material used in this form of the invention may include ammonia gas, liquid ammonia, aqueous ammonia, or some other liquid, gas, or solid (or combination of materials in different phases) which is or includes an antimicrobial agent. The method may also be employed together with injecting a suitable brine into the treated foodstuff as previously described either as the material was treated with ammonia or after it has been cut down into smaller pieces.

Apparatus 500 is similar to apparatus 100 shown in FIG. 1 in that it includes contacting device 102 along with the associated treatment material recovery system 108, treatment material supply vessel 105, and pump 106. Apparatus 500 further includes treatment fluid removal device 103 together with its associated rinsing fluid recovery system 112, rinsing fluid supply vessel 109, and pump 110. Cutting station 114 and injection device 115 are also shown in FIG. 5 as being included in apparatus 500. All of these devices in common with apparatus 100 are subject to the same variations described above in connection with the embodiment in which the treatment material is applied to a foodstuff having a frozen surface.

Unlike apparatus 100 in FIG. 1, apparatus 500 shown in FIG. 5 includes an arrangement of devices for placing a foodstuff in the desired surface treatment condition having a thin unfrozen surface layer above a frozen layer. In particular, apparatus 500 includes a frozen foodstuff supply 501 and a thawing device 502. Frozen foodstuff supply 501 may be any suitable device for supplying a foodstuff that is either completely frozen or at least having a frozen surface down to approximately one-half of an inch, or perhaps less depending upon the overall thickness of the foodstuff. Thawing device 502 receives a foodstuff having a frozen surface and thaws the surface to produce the desired unfrozen surface layer in the foodstuff according to this third form of the invention. Any suitable device may be used to produce the desired thin unfrozen surface layer above a deeper frozen layer. For example, thawing device 502 may be a device for applying a warm liquid such as water or a warm gas to the surface of foodstuff, or applying microwave or infrared radiation to the surface of the foodstuff.

It will be appreciated that an apparatus for applying a treatment material to the surface of a foodstuff according to this third embodiment in which the foodstuff includes a thin unfrozen surface above a deeper frozen layer may not include any components for actually placing the foodstuff in the desired surface condition. That is, the foodstuff may be received in the treatment apparatus when it is already in the desired surface treatment condition. Thus an apparatus for performing the desired surface treatment may omit frozen foodstuff supply 501 and thawing device 502 shown in FIG. 5.

Figure 6:
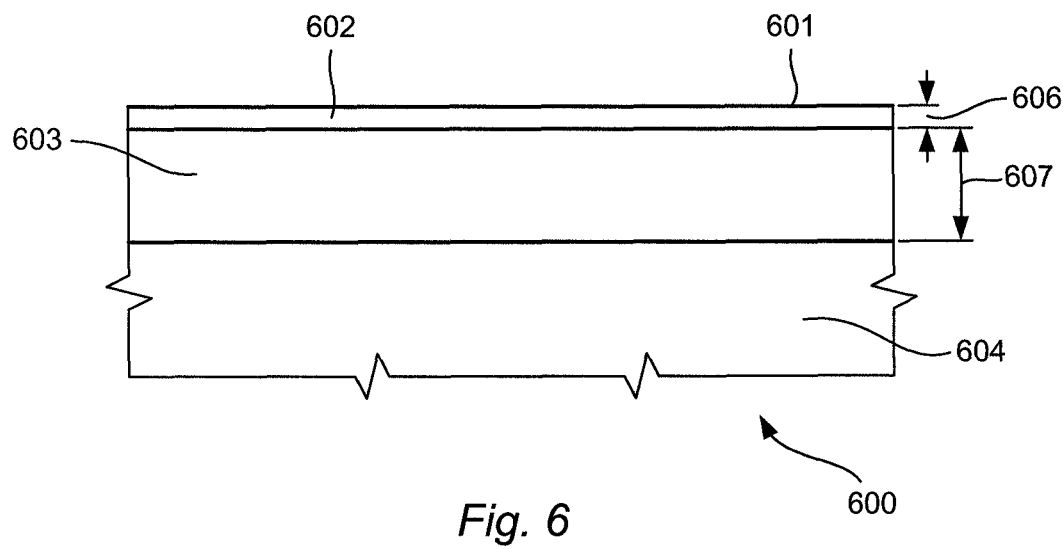
FIG. 6 is a diagrammatic section view of a foodstuff that may be treated with a treatment material according to the present invention

FIG. 6 shows a diagrammatic section view of a foodstuff 600 in the surface treatment condition according to the third form of the present invention. In this surface treatment condition, foodstuff 600 includes a frozen layer 603 below a thin surface layer 602 which is in an unfrozen state. Thin surface layer 602 is immediately below the surface 601 of the foodstuff and external to the deeper frozen layer 603. The particular foodstuff 600 shown in FIG. 6 includes a center portion 604 that is not frozen. However, it will be appreciated that rather than a frozen layer 603 and unfrozen center 604, a foodstuff having the desired thin unfrozen surface layer may include simply an unfrozen surface layer such as layer 602 with the remainder of the material in a frozen state. The thickness of unfrozen layer 602 as shown at dimension 606 in FIG. 5 is preferably no more than one-eighth of an inch. Where the remainder of the foodstuff is not frozen and thus the foodstuff includes a layer of frozen material 603 and unfrozen center 604, the thickness of the frozen layer shown as dimension 607 in FIG. 6 is preferably at least one-half of an inch for relatively thick foodstuffs, over two inches thick for example. The thickness of the frozen layer shown as dimension 607 in FIG. 6 may be less for thinner foodstuffs, provided that the layer is thick enough to maintain at least some thickness of frozen material throughout the time of contact with the treatment material at surface 601 and until the commencement of residual treatment material removal.

At the time the treatment material is applied to the surface 601 of foodstuff 600 in the surface treatment condition shown in FIG. 6, the frozen layer 603 or the entire remainder of the foodstuff below surface layer 602 may be at any temperature below the freezing temperature of the foodstuff. For example, frozen layer 603 and the material below (internal to) the frozen layer may be at a temperature of one degree Fahrenheit or more below the freezing temperature of the foodstuff. In any event the temperature of frozen layer 603 should be sufficiently low that unfrozen layer 602 does not exceed the maximum dimension of approximately one-eighth of an inch while the treatment material is in contact with surface 601 of the foodstuff and up to commencement of residual treatment material removal. Depending upon the nature of the treatment material, exceeding this maximum unfrozen surface layer dimension during treatment material contact may result in over treatment, which could leave a treatment material odor or produce other undesirable effects.

EXAMPLES

Warm beef carcass pieces (shortly after slaughter and before any chilling activity) were inoculated at the surface to an average microbe load of 227,600 cfu/g (colony forming unit per gram of meat)(5+log). Selected carcass pieces were dipped in liquid ammonia (ammonia below −28° F.) for 3, 6, 9, 12, 15, and 18 seconds. In all instances the contact between the meat pieces and the liquid ammonia resulted in complete elimination of the bacteria at the surface of the meat pieces. Some of the unfrozen inoculated beef carcass pieces were exposed to ammonia gas for 30, 60, 90, 120, 150, and 180 seconds. Complete elimination of bacteria occurred in the pieces treated for 60 seconds and over, indicating that complete elimination of bacteria occurred somewhere between 30 and 60 seconds. The ammonia gas treatments left a more significant ammonia odor as compared to the liquid ammonia treatments.

A first group of unfrozen beef carcass pieces were first inoculated at the surface to 159,900 cfu/g, and then frozen in a standard freezing process (not rapid freezing). Selected pieces of the frozen product were then immersed in liquid ammonia (ammonia below −28° F.) for 5, 10, 20, and 30 seconds. Another group of unfrozen beef carcass pieces were first inoculated at the surface to 312,600 cfu/g and then frozen in a standard freezing process. Selected pieces from this second group were then immersed in liquid ammonia at the same intervals as the first group. For both groups complete elimination of the bacterial load occurred in the pieces treated for 30 seconds of more, indicating that complete elimination of bacteria occurred somewhere between 20 and 30 seconds of treatment. Residual ammonia odor in all treated pieces was less than in the product treated with ammonia gas as discussed in the preceding paragraph. There was little variation in residual ammonia odor across the various liquid ammonia treatment times.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method including:
    (a) freezing a surface of a foodstuff by immersing the surface of the foodstuff in an antimicrobial treatment material comprising an aqueous ammonia solution, the antimicrobial treatment material freezing the surface of the foodstuff immediately on contact; and
    (b) removing residual antimicrobial treatment material from contact with the foodstuff.

2. The method of claim 1 wherein the antimicrobial treatment material is maintained in contact with the surface of the foodstuff to freeze the foodstuff to a depth of no less than 0.010 inch below the surface of the foodstuff.

3. The method of claim 1 wherein removing residual antimicrobial treatment material from contact with the surface of the foodstuff includes draining the residual antimicrobial treatment material away from the surface of the foodstuff.

4. The method of claim 1 wherein removing residual antimicrobial treatment material from contact with the surface of the foodstuff includes holding the foodstuff and residual antimicrobial treatment material under conditions which allow residual antimicrobial treatment material to go to a gas phase and displacing the gaseous antimicrobial treatment material from the surface of the foodstuff.

5. The method of claim 1 wherein removing residual antimicrobial treatment material from contact with the foodstuff includes rinsing the surface of the foodstuff with a rinsing fluid.

6. The method of claim 5 wherein the rinsing fluid includes water.

7. The method of claim 6 wherein the water in the rinsing fluid includes a carbonic acid solution.

8. The method of claim 5 wherein the rinsing fluid includes carbon dioxide gas.

9. The method of claim 1 wherein removing residual antimicrobial treatment material from contact with the foodstuff includes applying electromagnetic radiation to the foodstuff to heat the foodstuff.

10. The method of claim 1 wherein the foodstuff is a meat product, and further including after freezing the surface of the meat product by contacting the surface of the meat product with the antimicrobial treatment material:
    (a) inserting a number of injection conduits into an interior of the meat product through the meat product surface that was contacted with the antimicrobial treatment material; and
    (b) injecting a fluid into the interior of the meat product through the injection conduits.

11. The method of claim 1 wherein the foodstuff is a primal cut of meat, and further including:
    (a) after removing residual antimicrobial treatment material from the surface of the primal cut of meat, separating an additional cut of meat from the primal cut of meat;
    (b) inserting an injection conduit into an interior of the additional cut of meat; and
    (c) injecting a fluid into the interior of the additional cut of meat through the injection conduit.

12. A method of treating a foodstuff, the method including:
(a) maintaining the foodstuff in a surface treatment condition in which the foodstuff includes a frozen layer beneath a foodstuff surface to be treated and an unfrozen surface layer external to the frozen layer and extending to the foodstuff surface to be treated; and
(b) applying an antimicrobial treatment material to the foodstuff surface to be treated while the foodstuff is maintained in the surface treatment condition.

13. The method of claim 12 wherein the unfrozen surface layer extends no more than 0.125 inch beneath the foodstuff surface to be treated.

14. The method of claim 12 wherein the frozen layer is at a temperature of one degree Fahrenheit below the freezing temperature of the foodstuff or below that temperature.

15. The method of claim 12 wherein the antimicrobial treatment material includes ammonia gas.

16. The method of claim 12 wherein the antimicrobial treatment material includes liquid ammonia.

17. The method of claim 12 wherein the antimicrobial treatment material includes aqueous ammonia.

18. The method of claim 12 wherein the foodstuff is an intact meat product and further including after applying the antimicrobial treatment material to the intact meat product surface to be treated:
(a) inserting a number of injection conduits into an interior of the intact meat product through the intact meat product surface to be treated; and
(b) injecting a fluid into the interior of the intact meat product through the injection conduits.

19. The method of claim 12 wherein the foodstuff is a primal cut of meat and further including:
(a) after applying the antimicrobial treatment material to the primal cut of meat, separating an additional cut of meat from the primal cut of meat;
(b) inserting an injection conduit into an interior of the additional cut of meat; and
(c) injecting a fluid into the interior of the additional cut of meat through the injection conduit.

20. The method of claim 12 further including applying microwave or infrared electromagnetic radiation to the foodstuff.

21. A method including:
(a) freezing a surface of a foodstuff by contacting the surface of the foodstuff with an antimicrobial treatment material comprising liquid ammonia, the antimicrobial treatment material freezing the surface of the foodstuff immediately on contact; and
(b) removing residual antimicrobial treatment material from contact with the foodstuff.

22. The method of claim 21 wherein the antimicrobial treatment material includes liquid ammonia at a temperature of no greater than −28° F.

23. The method of claim 21 wherein the surface of the foodstuff is contacted with the antimicrobial treatment material by immersing the foodstuff in the liquid ammonia.

* * * * *